INVENTOR
Shigeru Kuwayama

BY

ATTORNEY

Sept. 16, 1969 SHIGERU KUWAYAMA 3,467,393

SIMPLE SOUND REPRODUCING DEVICE

Filed June 29, 1967 2 Sheets-Sheet 2

INVENTOR

BY

ATTORNEY

United States Patent Office
3,467,393
Patented Sept. 16, 1969

3,467,393
SIMPLE SOUND REPRODUCING DEVICE
Shigeru Kuwayama, 60, 2-chome, Shimouma-cho, Setagaya-ku, Tokyo, Japan
Filed June 29, 1967, Ser No. 650,091
Int. Cl. G11b 3/26
U.S. Cl. 274—9 5 Claims

ABSTRACT OF THE DISCLOSURE

A sound reproducing device comprising a pickup having a stylus located over a turntable adapted to receive a record thereon, and an arm extending substantially in the range of operation of the pickup adjacent the latter. The arm is pressed by a pressing means, such as a plate spring, against the pickup and a stylus pressure is applied by the action of the spring on the arm pressing the stylus against the record, which pressure becomes greater as the stylus moves operatively towards the center of the turntable.

The present invention relates to a simple sound reproducing device, in general, and to a simple sound reproducing device employed in a gramophone or a sound producing toy, housing a phonographic mechanism, in particular.

It is an object of the present invention to provide a sound reproducing device which can always reproduce sounds of a normal tone by revolving a turntable at constant speeds.

With the above and other objects in view, which will become apparent in the following detailed description, the present invention will be clearly understood in connection with the accompanying drawings, in which.

Figure 1:
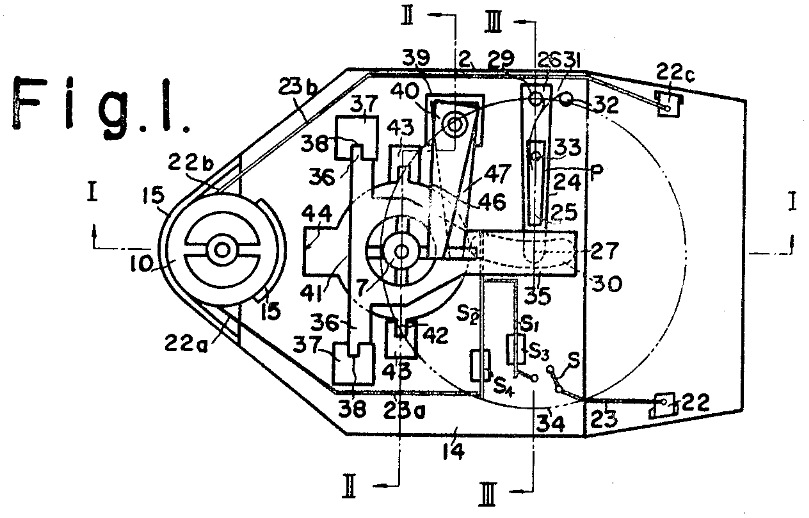
FIGURE 1 is a plan view of the sound reproducing device of the present invention.

Referring now to the drawings, and more particularly to FIGS. 1–4, a simple sound reproducing device according to an embodiment of the present invention comprises a casing 1 housing a pickup P located on a turntable 6 supporting phonographic records; an arm 35 extends nearly in the operative zone of the pickup; and the arm is pressed by a pressing means like a plate spring and the arm is disposed in such relation with a stylus of the pickup that the stylus pressure of the stylus thereby is largest towards the center of the turntable.

The casing 1 houses a back plate 3 of a chassis 2, on which back plate 3 is fixed a cover 4 adapted to open or close, preferably by a rubber plate 5, or other hinge means, or the like. A turntable 6 is mounted on the cover 4 through a shaft 7. A record 13 engages a boss part 8 of the turntable 6 by means of springs 9, and an endless belt 12, which consists of elastic material such as rubber or the like, encircles the outer periphery of the turntable 6 and a pulley 11 of the motor 10, and consequently the turntable 6 turns around itself and urges the record 13 to turn with the revolution of the motor 10.

The motor 10 is mounted on the upper surface 14 of the chassis 2 and is held in position by side walls 15 formed in a manner so as to surround the motor. The pulley 11 is provided with a roulette which is connected directly to the motor shaft from the bottom of the motor. On the lower part of the pulley 11 is a pulley receiver 17 of plate shape.

A battery 21 is provided in a part of the chassis 2 and connected to a terminal 22*a* of the motor 10 from a terminal of an anode 22, lead wire 23, switch and lead wire 23*a*, and from the other terminal 22*b* of the motor

10 to a terminal 22*c* of a cathode through a lead wire 23*b*, thereby completing an electric circuit. An arm 24 of a pickup P is provided, part of which is a hollow shape 25. One end 26 of the arm is pivoted on the upper surface of the chassis 2, and the other end is formed substantially into a boss part 27 of inverted truncated cone shape. The boss part 27 is provided with a stylus 28. The boss part passes through a slot 30 (FIG. 1) or arcuate shape and has a pivoting shaft 29 at the center of the curvature of the slot 30 on the upper surface of the chassis 2. Consequently, the stylus 28 at the end of the boss part 27 is brought into contact with the record 13.

The boss part 27 swings to the left and right in the slot 30 about the shaft 29. A fixed piece $S_1$ and a movable piece $S_2$ are supported on projections $S_3$ and $S_4$ provided on the upper surface of the chassis 2 with the movable piece $S_2$ in the area of movement of the boss part 27.

The pin 28 is always located outside the record, because spring 31 is wound about a projection 32 and the shaft 29 and one end 33 which presses against the hollow part 25 of the arm 24.

A speaker 34 is fixed on one end of arm 35. Shafts 36 extending from both sides of the other end of the arm 35 are pivotally mounted in longitudinal grooves 38 of bearings 37 which extend from the upper surface of the chassis 2. The arm 35 contacts the upper end of the boss part 27 of the pickup P. A portion of the arm 35 is pressed slightly by a plate spring 40 secured to a projection 39 on the upper surface of the chassis 2 so as to provide sufficient stylus pressure to the stylus 28.

The arm 35 extends to the outer periphery of the turntable 6 over the shaft 7 from the bearings 37. The plate spring 40 has two portions, i.e., an upper spring portion 46 and a lower spring portion 47. The upper spring portion 46 presses against the upper surface of the arm 35 between the rest position (adjacent the central part) of the pickup P and the bearings 37. As the pickup P moves from the outer periphery of the turntable 6 towards the center, the stylus pressure becomes so much larger.

The turning force of the turntable 6 driven by the belt 12 becomes larger as it advances from the outer periphery towards the center. Accordingly, the frictional force and the turning force between the stylus 28 and the record 13 will substantially be balanced so that the turntable 6 turns at constant speed.

Figure 2:
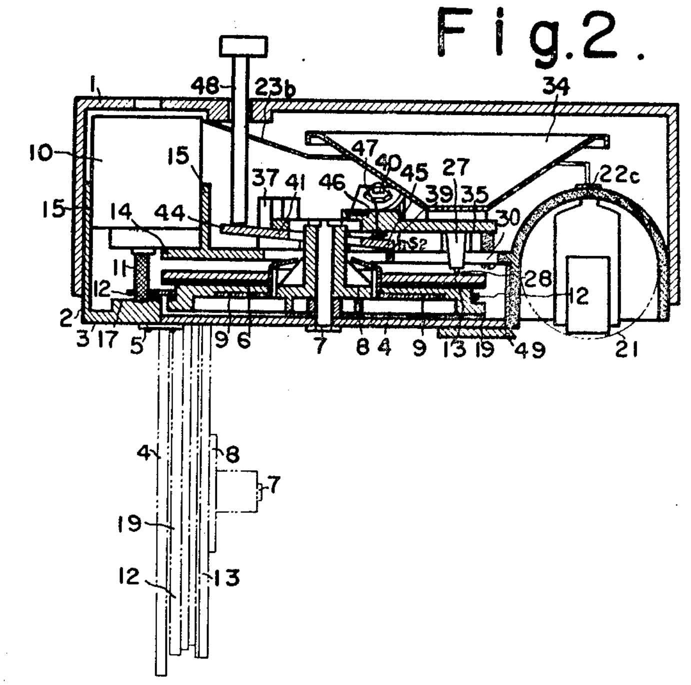
FIG. 2 is a section along the lines I—I of FIG. 1.
Figure 3:
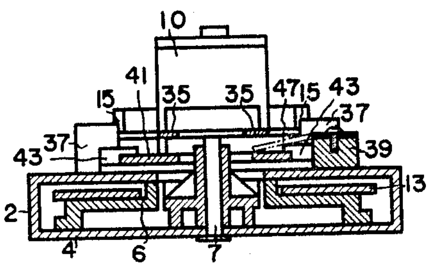
FIG. 3 is a section along the lines II—II of FIG. 1.
Figure 4:
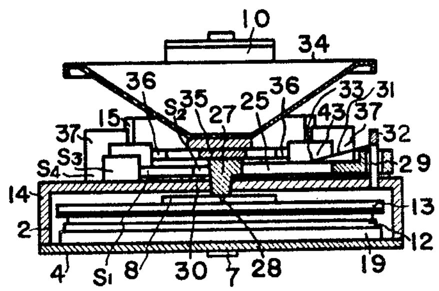
FIG. 4 is a section along the line III—III of FIG. 1.

An operating piece 41 of approximately circular shape is provided, and shaft parts 42 formed on both sides thereof are pivoted in longitudinal groves of bearings 43. One end of the operating piece 41 is provided with a projection 44 and the other end 45 is pressed by the plate spring 40 fixed on the projection 39. The lower spring portion 47 which is below the upper spring portion 46 rests against the bottom of the arm 35 and abuts the top of the operating piece 41, and is adequately twisted as indicated in FIG. 2. The lower spring portion 47 abuts the lower end of the arm 35 which presses the pickup.

The side walls, bearings, projections, etc., provided on the chassis 2 may be formed integrally with the chassis consisting of a material such as synthetic resin, or the like, formed by an injection molding process. The pickup P and the boss part 27 are preferably manufactured integrally of insulating synthetic resin.

built in the interior of a toy, such as a doll, an animal toy,

The device according to the present invention may be and the like, or it may be adequately arranged in the interior.

A portion of an operating rod 48 cooperates with the operating piece 41, projects from the casing 1, and is adapted in such a manner as to be pushed downwardly. By this operation, the projection 44 of the working piece 41 is pushed downwardly. The pressing arm 35 of the pickup P accordingly is pushed upwardly against the plate spring 40 by lever action so that the arm 24 of the pickup swings to the right (FIG. 1) and stops at one end of the slot 30. As the arm 24 moves to the right, the movable contact $S_2$ of a switching device which presses against the arm, contacts the fixed piece $S_1$, whereby the record 13 starts to turn. When the pressure on the projection 44 of the operating piece is removed, the pressing arm 35 of the pickup P presses the boss part 27 of the pickup P and presses the stylus 28 against the record 13. With the revolution of the record 13, the stylus 28 moves from the right to the left (FIG. 1), turning the stylus pressure stronger, and pressing the movable contact $S_2$ of the switching device so that the switching device is cut and the record stops moving.

In replacing a new record, a hook 49 on the cover 4 may be removed with one's fingers and the cover can be opened. Upon opening the cover, the pressing arm 35 will move downwardly until it contacts the plate spring 40 so that when the switching device tends to turn "on," the boss part 27 of the pickup P, because of its inverted truncated cone shape, acts to press the movable contact $S_2$ of the switching device more strongly, and, therefore, the two contacts will not contact each other.

In the embodiment described above, the present invention provides for maintaining the turning speed of the turntable 6 constant in association with the movement of the stylus 28 towards the center of the turntable 6, and the stylus pressure is provided by the pickup P having the spring 40 directly connected therewith. Simple construction, accurate and true sound reproduction is secured by the present invention.

I claim:

1. A sound reproducing device, comprising:
- a housing,
- a turntable pivotally mounted in said housing and adapted to receive a record thereon,
- a pickup including a stylus pivotally disposed over said turntable,
- means for rotating said turntable,
- speaker means operatively connected to said pickup for reproducing sound from said record,
- an arm movably mounted in said housing and extending substantially in the range of operation of said pickup and adjacent thereto,
- means for continuously pressing said arm against said pickup during operation in a direction causing said stylus to press upon said record with a stylus pressure, and
- said pressing means disposed in said housing and acting upon said arm such that said stylus pressure becomes greater as said stylus moves closer to the center of said turntable.

2. The sound reproducing device, as set forth in claim 1, wherein:
- said arm extending at one end to the outer periphery of said turntable and at the other end beyond the center of said turntable and pivotally mounted relative to said housing thereat, and
- said pressing means disposed in said housing and acting at a position adjacent the center of said record.

3. The sound reproducing device, as set forth in claim 2, further comprising:
- an operating plate constituting a double armed lever pivotally mounted in said housing with one end thereof adapted to move against said arm causing said arm to move away from and release said pickup when said other end of said lever is actuated,
- an operating rod extending through said housing and having one end movably disposed against said other end of said double armed lever for actuating said other end,
- said lever being spring biased in inoperative position with said other end not actuated,
- spring means biasing said pickup toward the outer periphery of said record and effective for same when said arm is moved away from said pickup thereby releasing said stylus pressure, and
- switch means disposed in the path of said pickup for turning on said device when said pickup is moved to the outer periphery of said record and for turning off said device when said pickup moves to the center of said record.

4. The sound reproducing device, as set forth in claim 1, wherein:
- said pressing means is a plate spring.

5. The sound reproducing device, as set forth in claim 1, wherein:
- said speaker means is mounted on said arm.

References Cited

UNITED STATES PATENTS

| | | | |
|---|---|---|---|
| 1,538,866 | 5/1925 | Rogers | 274—1.6 |
| 1,545,840 | 7/1925 | Merrill | 274—1.6 |

FOREIGN PATENTS

| | | |
|---|---|---|
| 707,932 | 4/1965 | Canada. |

HARRY N. HAROIAN, Primary Examiner

U.S. Cl. X.R

274—14